(12) United States Patent
Verma et al.

(10) Patent No.: US 10,721,141 B1
(45) Date of Patent: Jul. 21, 2020

(54) RESOURCE LIFECYCLE AUTOMATION

(71) Applicant: Amazon Technologies, Inc., Reno, NV (US)

(72) Inventors: Varun Verma, Newcastle, WA (US); Daniel Rabinovich, Seattle, WA (US); Shobha Agrawal, Sammamish, WA (US); Josephine Reiko Gibney, Seattle, WA (US); Rucha Nene, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 385 days.

(21) Appl. No.: 15/826,349

(22) Filed: Nov. 29, 2017

(51) Int. Cl.
*G06F 15/173* (2006.01)
*H04L 12/24* (2006.01)
*H04L 29/08* (2006.01)

(52) U.S. Cl.
CPC ...... *H04L 41/5054* (2013.01); *H04L 41/0893* (2013.01); *H04L 67/325* (2013.01)

(58) Field of Classification Search
USPC ....... 709/203, 206, 217, 219, 223, 224, 226, 709/228, 230, 232, 238; 714/47.1
See application file for complete search history.

(56) References Cited

U.S. PATENT DOCUMENTS

| | | | | |
|---|---|---|---|---|
| 9,600,500 | B1* | 3/2017 | Gupta | G06F 11/1471 |
| 2013/0227352 | A1* | 8/2013 | Kumarasamy | G06F 11/3072 714/47.1 |
| 2015/0244775 | A1* | 8/2015 | Vibhor | G06Q 10/06 709/203 |
| 2016/0248676 | A1* | 8/2016 | Thanasekaran | H04L 47/12 |
| 2017/0083517 | A1* | 3/2017 | Mitkar | G06F 16/583 |

* cited by examiner

*Primary Examiner* — Quang N Nguyen
(74) *Attorney, Agent, or Firm* — Hogan Lovells US LLP

(57) ABSTRACT

Policies can be applied to, and enforced for, specific resources by applying a corresponding tag to those resources. An entity, such as a customer of a resource provider, can generate one or more policies to be applied to a set of resources, where those policies can relate to data retention, backup, lifecycle events, and other such aspects. Each policy can be associated with a particular tag, which may comprise a key-value pair to be applied to various resources. A policy enforcement manager can determine the tagged resources and ensure that the relevant policies are applied. The policies can include logic or intelligence for performing a variety of tasks with respect to resources, groups of resources, or types of resources, as identified using the tags.

14 Claims, 8 Drawing Sheets

RESOURCE LIFECYCLE AUTOMATION

BACKGROUND

As an increasing number of applications and services are being made available over networks such as the Internet, an increasing number of content, application, and service providers are turning to technologies such as remote resource sharing and cloud computing.

Cloud computing, in general, is an approach to providing access to electronic resources through services, such as Web services, where the hardware and/or software used to support those services is dynamically scalable to meet the needs of the services at any given time. A user or customer typically will rent, lease, or otherwise pay for access to resources through the cloud, and thus does not have to purchase and maintain the hardware and/or software to provide access to these resources. In order to ensure that data stored by such resources is not lost or corrupted, customers often want to ensure that one or more backup mechanisms are in place. For large numbers of resources, however, this can be a very complicated process that is at risk of data loss due to human error and other causes. Further, such approaches can result in outdated data not being properly deleted or managed, resulting in excess resources being utilized and excess cost incurred.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure overcome one or more of the aforementioned and other deficiencies experienced in conventional approaches to managing resources in an electronic environment. In particular, various embodiments enable policies to be applied to, and enforced for, specific resources by applying a corresponding tag to those resources. An entity, such as a customer of a resource provider, can generate one or more policies to be applied to a set of resources, where those policies can relate to data retention, backup, lifecycle events, and other such aspects. Each policy can be associated with a particular tag, which may comprise a key-value pair that can be applied to various resources. In order to have the policy enforced for a particular resource, or set of resources, the customer can apply the tag to the resource(s). A policy enforcement manager can then determine the tagged resources and ensure that the relevant policies are applied. If a customer wants to change the way the resources are managed, the customer can simply update the policy associated with a particular tag, and that policy will be automatically updated and enforced for the corresponding resources. The policies can include logic or intelligence for performing a variety of tasks with respect to resources, groups of resources, or types of resources, among other such options.

Various other functions and advantages are described and suggested below as may be provided in accordance with the various embodiments.

Figure 1:
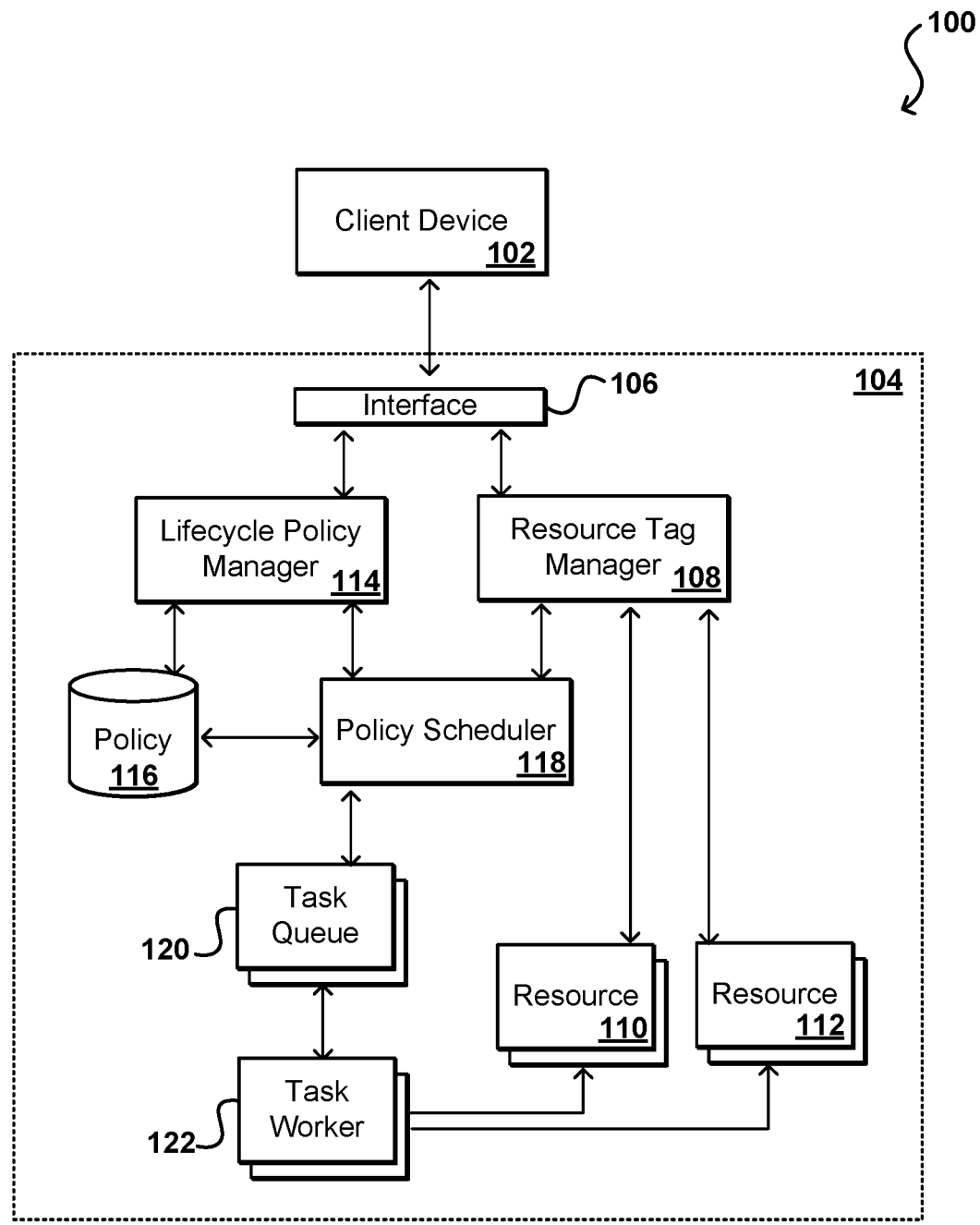
FIG. 1 illustrates an example system for automating resource lifecycle that can be utilized in accordance with various embodiments.

FIG. 1 illustrates an example system 100 that can be utilized to provide for automated lifecycle management of resource in a resource provider environment 104, or other multi-tenant or shared resource environment wherein different resources, or portions of those resources, may be allocated to different customers of the resource provider. In this example, a customer can utilize a client device 102 to make calls across one or more networks to access data stored by one or more types 110, 112 of electronic resources, or groupings of resources located in different locations, among other such options. While these resources can be any appropriate resources useful for storing, processing, or transmitting data, for example, the resources in many instances will include resources capable of storing data on behalf of a customer. These data resources can include, for example, volumes of block storage or data storage buckets of a storage service, among other such options discussed and suggested herein. Other physical or virtual resources, and portions thereof, can be allocated to customers or entities as well within the scope of the various embodiments.

Whenever data is stored using one of these resources, there is a chance that the resource might fail or there might be another issue where the data is lost or at least partially corrupted or inaccessible. Accordingly, most conventional data storage systems provide some failure recovery mechanism, such as to store a redundant copy of the data or take periodic snapshots of the data, which can facilitate data recovery. A data snapshot can include a read-only copy of the data, or a portion or overview of the data, frozen for a particular point in time, enabling the data to be restored back to at least that point in time in at least some embodiments. In one example, a customer might have data stored to a data volume of a block data storage service, and might instruct the system to periodically take snapshots of the data in order to provide a backup mechanism for the stored data. Today, the customer has to manually instruct the creation and/or deletion of a snapshot, or at least manage the lifecycle for a given resource. If the user has data stored in multiple locations, which may involve different types of resources, then this management process can become burdensome and a potential source for data loss if snapshots for one of those resources are not managed properly.

Accordingly, approaches in accordance with various embodiments attempt to automate the lifecycle for block storage resources, as well as other types of resources available through a service provider or other such environment. In various embodiments, a customer can utilize a client device 102 to submit a request to add or associate a tag (e.g., metadata, a data object, a data record, or a piece of data) to one or more resources 110 allocated to that customer. This can include, for example, a customer identifying to a resource tag manager 108 or other such system an identity, identifier, or other information useful for tagging a specific resource or set of resources, as discussed in more detail elsewhere herein. Each tag can be a key-value pair, for example, where the tag identifies a certain snapshot policy that is to be implemented for that resource. The resources in at least some embodiments are referred to herein as "block storage resources," which can refer to any of a number of types of resources relating to the block storage of data. These block storage resources can include block storage data volumes, copies of those data volumes, snapshots of those data volumes, or computing instances associated with data storage, among other such options.

The customer can also submit at least one policy to a lifecycle policy manager 114, or other such system or service, that is capable of receiving and managing policies for the resource provider environment. The policy can be any appropriate policy as discussed herein, such as may identify a frequency for creating, deleting, or otherwise managing a concurrent number or snapshots for resources having an identified tag, among other such options. The policies for a customer can be stored to a policy data store 116 or another such location. The policies can then be analyzed or enacted using a policy scheduler 118, for example, which can determine the timing for various actions of the stored policies for resources tagged with the corresponding tag. The policy scheduler can attempt to enforce the policy at any relevant time in some embodiments, while in other embodiments the scheduler will only attempt to enforce a policy when the scheduler receives indication that at least one resource 110, 112 has been tagged with the corresponding resource. As part of the tag manager functionality, the manager 108 might expose a list of applied tags for which the policy scheduler 118 should manage corresponding policy actions.

In this example, a customer can have applied a specific tag to one or more resources 110, 112 in the resource provider environment 104. It should be understood that the policies can potentially be enforced for resources outside such an environment as well within the scope of various embodiments. A corresponding policy for the tag can be stored to the policy data store 116, and can include information about when snapshots should be created or deleted for each resource having that tag applied. The policy scheduler can determine that a task is to be performed, such as to create a new resource snapshot for an identified resource having that tag applied, and can place a task in a task queue 120 or other such location, from which a task worker 122 (such as a resource, process, or on-demand resource capacity) can pull and execute the task with respect to the corresponding resource. It should be understood, however, that queues are not required and that other request or notification mechanisms can be used as well within the scope of the various embodiments. The worker 122 can then perform the operation(s) associated with the particular task, and can report back to the policy scheduler as to whether the task was completed successfully. If not, the task may be retried up to a number of retries or other such criterion. If the task cannot be completed successfully then an alarm or notification can be generated such that a remedial action can be performed.

In such an implementation, a customer can manage snapshot lifecycles by providing one or more types of policies, each of which has a corresponding tag or tag data. Other metadata or identifiers than tags can be used as well within the scope of the various embodiments. If a customer wants to change the way in which snapshots are managed, the customer can simply modify the policy and any resources with the corresponding tag will automatically have the policy updates applied. Similarly, if a customer wants to add or remove a particular resource from the lifecycle, the customer can add or remove the relevant tag, or modify the tag applied. The scheduler 118 and other components can then take care of implementing and enforcing the policies on the relevant resources. Customers can also view the resources for a specific policy by selecting a tag through a console or other application, which can then cause all corresponding resources to be identified.

Such an approach provides not only ease of management for customers, but also cost savings and improved resource utilization for providers. The ability to enforce policies automatically can ensure that snapshots are deleted according to a determined schedule or frequency. Further, a policy can indicate a maximum number of snapshots to be concurrently maintained for a particular resource, such that undeleted but outdates snapshots do not linger in the system. Further, the termination of use of a given resource can be identified to the tag manager based on the tag, which can cause the related snapshot(s) to be automatically deleted or otherwise handled. Further, the automation of the process reduces the need for manual action or intervention except in the case of a problem or issue with the automated lifecycle management. The timely deletion of snapshots can also help to ensure that customers do not receive a larger storage bill than expected due to forgetting to delete large, out dated snapshots or redundant data volumes, etc.

Another potential advantage of such an approach is that policies can be implemented to ensure compliance with organizational requirements. For example, some customers have to comply with requirements for a particular industry or organization wherein backup copies of data need to be created and maintained for at least a determined amount of time, such as to create weekly snapshots that are each maintained for a year, among a wide variety of other such options. Such an approach can help to ensure compliance without the risk of a person missing the creation of a snapshot or accidentally deleting it at the wrong time, etc. Such an approach enables changes to be made in response to differing requirements without risk of missing one or more resource copies. Such an approach also provides compliance automation without the need for customers to develop or configure a tool or script to manage compliance.

Figure 2:
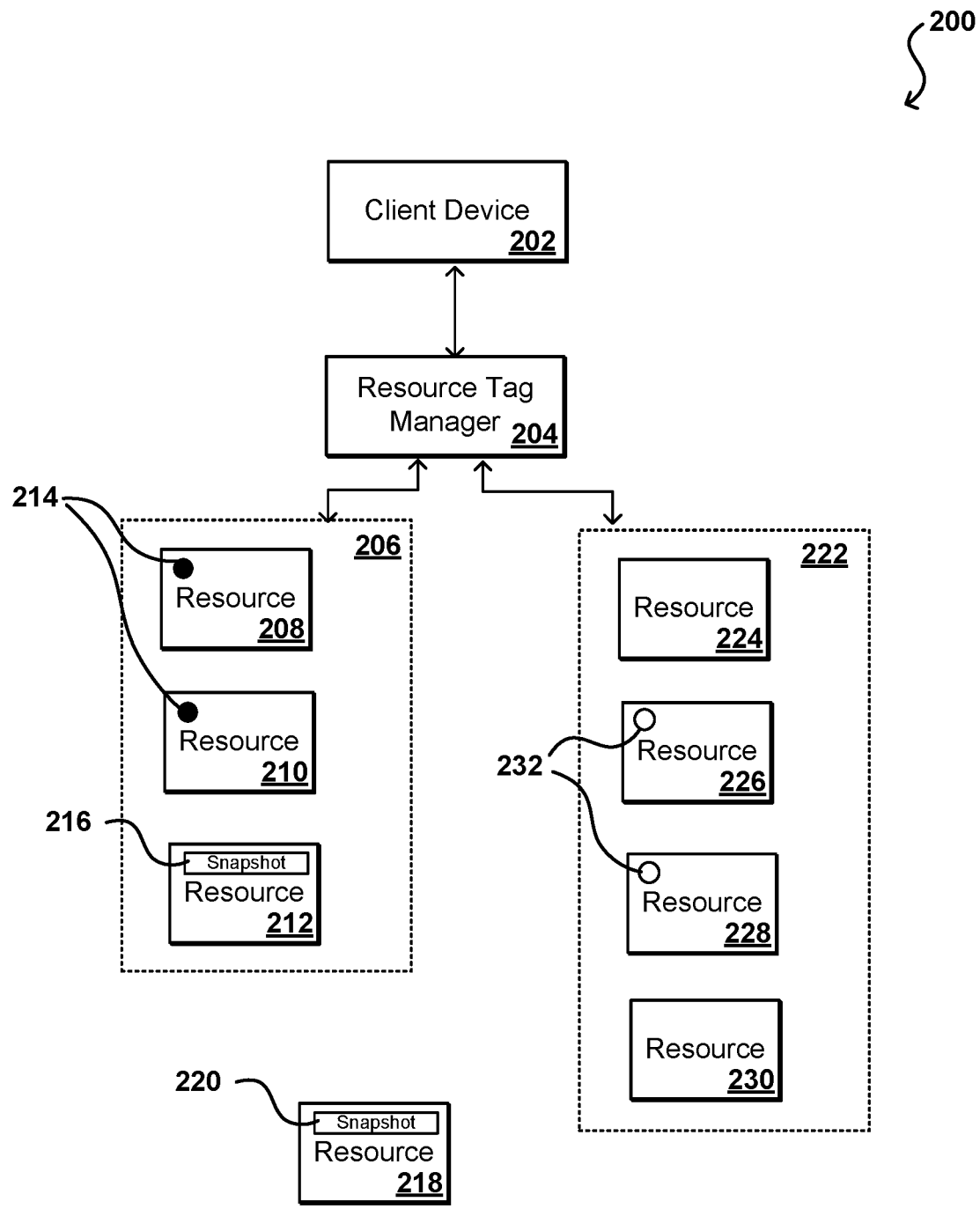
FIG. 2 illustrates an example approach to tagging resources for snapshot management that can be utilized in accordance with various embodiments.

In some embodiments, a service such as a tag manager 108 can enable customers to assign their own metadata to various resources in the form of tags, while other metadata or identifiers can be used as well as discussed elsewhere herein. FIG. 2 illustrates an example configuration 200 wherein a customer can use a client device 202 or console to work with a resource tag manager 204 to add tags 214, 232 to various resources. These can be different tags that correspond to different policies, or can be different versions of the same tag used for different types of resources, or identical tag types, within the scope of the various embodiments. The resources can be grouped by type of service or location, among other such options, such as a first resource offering 206 resources 208, 210, 212 relating to block storage and a second offering 222 including resources 224, 226, 228, 260 relating to cloud storage. The tag manager can enable the customer to create one or more tags that are associated with one or more policies, and cause those tags to be applied to, or otherwise associated with, specific resources or resource types allocated on behalf of that particular customer. It should be understood that other types of users or entities may have permissions to apply tags to certain resources, or create or modify tags, within the scope of the various embodiments.

In some embodiments, a customer can categorize the resources in different ways, such as by purpose, owner, or environment. In such an approach, the different environments 206, 222 can correspond to different categorizations. Such an approach can be beneficial when a customer has many allocated resources of the same type. A specific resource can be identified quickly and easily by using the assigned tags, as a customer can search and filter resources using the tag data. In some embodiments, each tag consists of a key and an optional value, each of which can be defined by the customer. As an example, a customer can define a set of tags for the virtual machine instances under the customer account, which can assist with tracking information such as the owner and stack level for each instance. These tags can be leveraged to also identify policies to be applied to, or enforced for, specific resources. A resource can also have multiple tags applied for different purposes. For example, a first tag might indicate an owner, such as with the key-value pair "Owner=DbAdmin," while a second tag might indicate a policy to apply, such as "Snapshot_Policy=AA_Compliance". Various other tags can be applied as well for other purposes. In at least some embodiments the tags will not have any semantic meaning to the system or environment, but will instead be interpreted strictly as a string of characters. Further, tags in some embodiments will not be automatically assigned to resources, although in some embodiments the allocation process can include the assignment of one or more tags as specified by the customer or control plane manager, etc. A customer can also use a client device, console, command prompt, API, or other such mechanism to edit tag keys and values at any time, as well as to add, remove, or modify tags attached to one or more resources. A customer can also use such a tool to manager permissions as to users, or types or roles of users, who can take such actions. Instead of identifying a policy, the tag could instead identify a type of usage for the resource, such as by using a tag "Usage=Production", and then the policy manager and/or scheduler can determine to apply a policy for production-related resources.

A user can also create or provide policies as appropriate, as long as those policies comply with any requirements or restrictions of the relevant systems, resources, etc. For example, a policy can indicate for the any storage volumes that have a specific tag, such as "usage_type=production", snapshots should be created at 9:00 am local time on a daily basis, and five copies of the snapshot should be stored at any time. The enforcement of this policy would cause a snapshot to be created at 9:00 am every day, with a given snapshot being deleted on the sixth day. The policy can also cause the oldest snapshot to be deleted, with the five most recent being retained. Various processes for creating and deleting snapshots exist in various systems, and where applicable this functionality can be leveraged by the scheduler. In order to use the scheduler, a policy in at least some embodiments needs to specify the time and frequency at which snapshots should be created, as well as the retention rules such as how long a snapshot is to be retained. In addition to being implemented, the policy can be evaluated on a periodic basis to ensure that any changes are captured and enforced. A customer can also indicate whether any changes are to apply to existing snapshots, or only newly created snapshots going forward. A customer can specify other actions as well, such as to move snapshots into an archival storage instead of deleting, and potentially changing the tag during such an action. A customer can also potentially include some logic in the retention policy, such as to keep a number of copies that might depend upon different criteria, such as load, time of year, etc.

In some embodiments the policy manager can also be responsible for managing policy conflicts. For example, a policy might change on the retention side to indicate that they want to keep the last five snapshots and keep them for thirty days. It would then be necessary to ensure that, in at least some embodiments, both retention options are satisfied and that a snapshot is not deleted before thirty days, for example, if more than five snapshots are stored. The creation may not be as critical, as it may be less problematic to accidentally create an extra snapshot than to delete a snapshot that otherwise should have been retained. There may be more than one type of snapshot in some embodiments, however, which may impact the importance of the creation process. As mentioned, other tasks can be performed as well, such as creating or migrating volumes, rotating encryption keys, and the like. Tags can also potentially be associated with workflows as well as part of the relevant policies. For example, a recent snapshot might be stored in fast, solid state storage for an initial period of time, then stored to a different type of storage volume. After ninety days the data might then be migrated to archival storage, etc. Various custom schedules and workflows can be created and enforced as discussed herein.

As mentioned, a system in accordance with various embodiments can have a lifecycle policy management front end. Such a component can expose various APIs for policy metadata management to a caller. The front end can serve APIs to create a lifecycle policy, as well as to delete, describe, and update the policy. The front end can perform some basic validations (e.g., JSON validations or customer-policy limits validations) and then register the intent of the customer with respect to managing their lifecycle policies in a persistent data store. These operations can be performed synchronously. Lifecycle policy management workflows can be responsible, in some embodiments, for asynchronously driving the customer intent registered by the front end service to actual desired state. For example, a create policy workflow can drive a policy state from pending evaluation to active. The workflows can evaluate the policy which would include detailed validations, such as whether it can be assumed that various identity roles are defined in the account. The workflow can pass the policy to the scheduler, which can be responsible for parsing the various create and delete rules and scheduling the "create resource" and "delete resource" events, as well as deleting and/or updating already scheduled events. Once that's done the workflow can update the policy state to the desired state.

A lifecycle policy scheduler can be responsible for scheduling the "create resource" and "delete resource" events of a given policy. Recurring events can be created that correspond to the create schedule of the policy. Similarly, one-time "delete resource" ticks can be generated for specific communication channels. Ticks can also be generated in queues, with workers doing the actual work whenever the ticks are generated. The scheduler can receive a policy as input and then convert the create part of the policy to a schedule. For the retention rules, the scheduler can, for each policy of a certain type, describe resources created by that policy, such as to describe the snapshots in the generated tag. Based on the policy retention rules, a delete timestamp can be computed for all those snapshots which are in state completed. A one-time event can be scheduled for that delete timestamp. If an event is already scheduled, the scheduler can update the schedule to accommodate any changes in the policy. The scheduler can also persist the schedule identifier returned.

For each "delete only" policy, the resources can be described in the input tag, and for each snapshot listed in the input tag the tags for the resources can be described, along with the policies on those tags. A delete timestamp can be generated based on that for completed snapshots, and a one-time event can be created for that delete timestamp. If an event is already scheduled, the scheduler can update the schedule to accommodate any changes in the policy or any new tags getting associated or disassociated with the snapshots in question. The scheduler can also persist the schedule identifier returned. Instead of scheduling an event for all the snapshots, an event may be scheduled only if the delete timestamp is before a certain threshold, such as a few days.

A lifecycle policy scanner can be responsible for re-deriving the delete or retention rules of the policies. After a snapshot is marked with a delete timestamp, it can be associated with new tags that can affect the delete time. The scanner can scan the policy database every so many minutes and call the scheduler to re-evaluate the rules of the policy. The scanner can also be used to perform auxiliary operations such as to emit global metrics, monitor policies etc. With respect to the lifecycle policy management workers, these workers (i.e., on-demand configured resources) can be responsible for carrying out operations such as creating or deleing snapshots. The create work items can call a create resource API of the respective service. For a delete, the workers may have to be more cautious and again verify with the scheduler that this is indeed the right time to delete and that nothing has changed in between. An asynchronous monitoring service can be used along with the workers, which can keep track of the successful completion of the created snapshots and retry if failed.

A lifecycle policy data store can be the persistent storage storing the policy metadata. As mentioned, metadata can include information such as the policy ID, a customer ID, a name, a description, policy state, a tag to be applied, a JSON doc, a policy type, the tag(s) the policy is applied on, and a policy version, among other such options. For each policy, a history of the actions that are taken as part of that policy can be maintained. This can include things such as successful creation and deletion of snapshots, as well as the situations when the policy was in violation. Customers can make use of the history view to audit the policy executions.

In order to create a policy, a customer in some embodiments can call the lifecycle policy management frontend to create a policy. The frontend service can generate a policy ID and store the ID along with the policy JSON in the database. At this time, it will mark the policy state as Pending Evaluation. The front end service can also trigger a create lifecycle policy workflow and complete the API call. The customer now has a policy ID which it can use to repeatedly describe policy and check the policy state. The create lifecycle workflow can begin by performing the validations. It will then ask the scheduler to schedule the policy. The scheduler can look at the create section of the policy and convert it into a recurring schedule. Based on the schedule, ticks can be generated in a configured queue. The scheduler can evaluate the delete or the retention rules and compute a delete timestamp for each of the resources (if any). It can create a one-time delete event. The snapshot ID and policy ID can be placed in the tick metadata. At this point the policy can be marked as "Active". As soon as a create tick is generated, a worker can read the tick metadata which will include the policy ID for which this tick is generated. The worker can then describe the policy ID to get the policy JSON, and describe the resources for all the tags in the policy. For each of the resources the appropriate create API can be called. As soon as a delete tick is generated, a worker can pick the tick and delete the associated snapshot ID. It will be necessary in some embodiments to re-evaluate the policies before deleting the snapshot. At this point a policy history entry can be generated. In the meantime, the scanner can scan the active policies. Whenever the scanner will pick this policy, it can evaluate the delete schedule of the policy and compute a delete timestamp for each of the snapshot associated with this policy. There might be new snapshots created in the meanwhile and the delete event can be scheduled for those snapshots.

For a delete policy, a customer can issue a delete policy call passing in a policy ID. A front end service can change the policy state to "Deleting" and trigger a delete policy workflow. It can then complete the customer API call. The delete policy workflow can find out all the "create" schedule IDs that were persisted corresponding to this policy. It can call the scheduler to delete all those schedules. Behind the scenes the schedules can be deleted after which no more creates should happen as per the policy. The schedules are not being deleted corresponding to the deletes of existing snapshots, such that the system can continue to delete those snapshots whenever the tick is generated. The workflow can now update the policy state to "deleted". It should be noted that an alternative event-driven approach can be utilized. In the above approach the policies are scanned to schedule the delete resource actions, but event triggers can be implemented as well in various embodiments.

Figure 3:
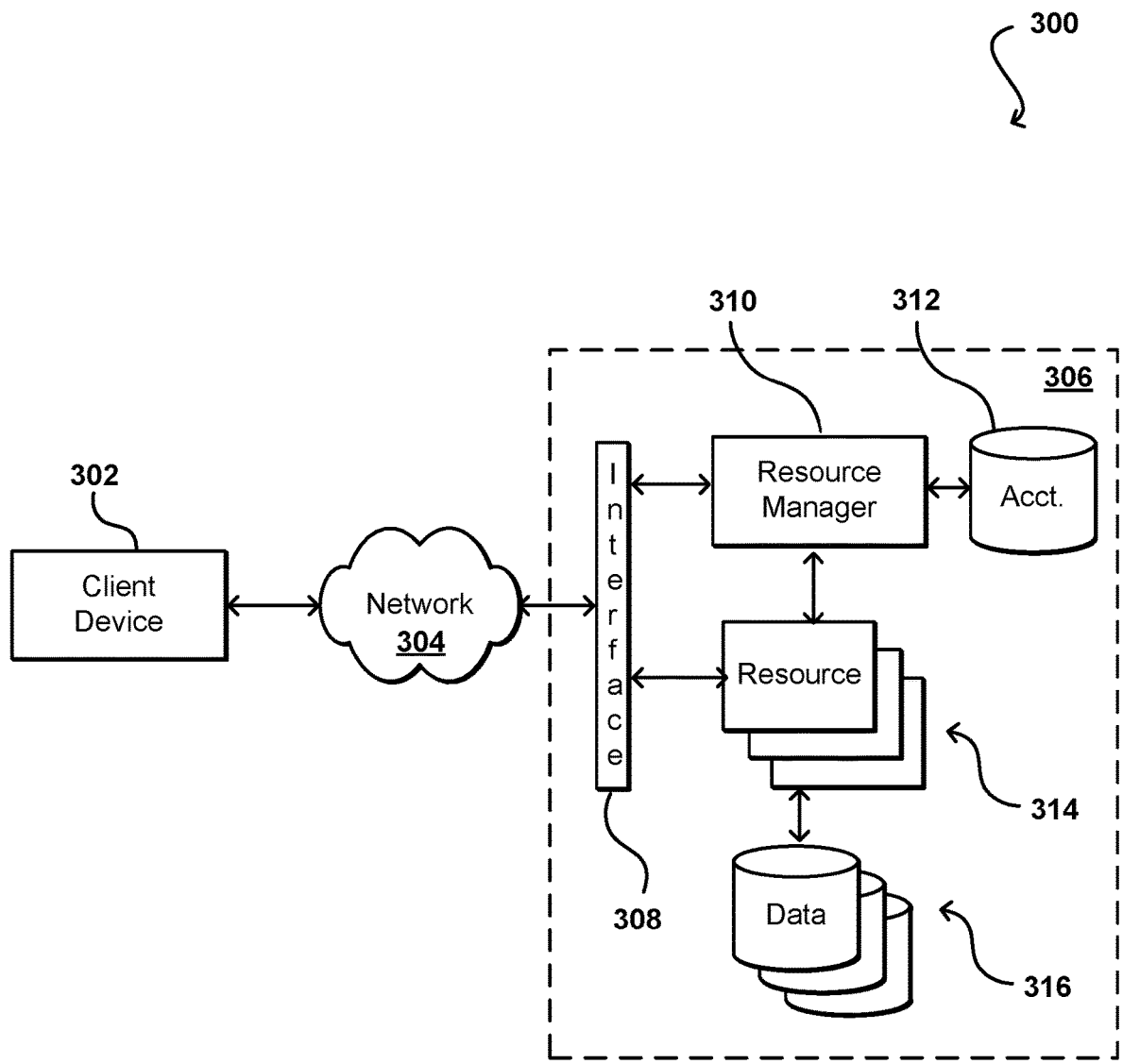
FIG. 3 illustrates an example environment in which aspects of the various embodiments can be implemented.

FIG. 3 illustrates an example environment 300 in which aspects of the various embodiments can be implemented. In this example a user is able to utilize a client device 302 to submit requests across at least one network 304 to a multi-tenant resource provider environment 306. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 304 can include any appropriate network, including an intranet, the Internet, a cellular network, a local area network (LAN), or any other such network or combination, and communication over the network can be enabled via wired and/or wireless connections. The resource provider environment 306 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 314 of one or more types. These types can include, for example, application servers operable to process instructions provided by a user or database servers operable to process data stored in one or more data stores 316 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 314 can submit a request that is received to an interface layer 308 of the provider environment 306. The interface layer can include application programming interfaces (APIs) or other exposed interfaces enabling a user to submit requests to the provider environment. The interface layer 308 in this example can also include other components as well, such as at least one Web server, routing components, load balancers, and the like. When a request to provision a resource is received to the interface layer 308, information for the request can be directed to a resource manager 310 or other such system, service, or component configured to manage user accounts and information, resource provisioning and usage, and other such aspects. A resource manager 310 receiving the request can perform tasks such as to authenticate an identity of the user submitting the request, as well as to determine whether that user has an existing account with the resource provider, where the account data may be stored in at least one data store 312 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 302 to communicate with an allocated resource without having to communicate with the resource manager 310, at least until such time as a relevant aspect of the user account changes, the user is no longer granted access to the resource, or another such aspect changes.

The resource manager 310 (or another such system or service) in this example can also function as a virtual layer of hardware and software components that handles control functions in addition to management actions, as may include provisioning, scaling, replication, etc. The resource manager can utilize dedicated APIs in the interface layer 308, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 308 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 4:
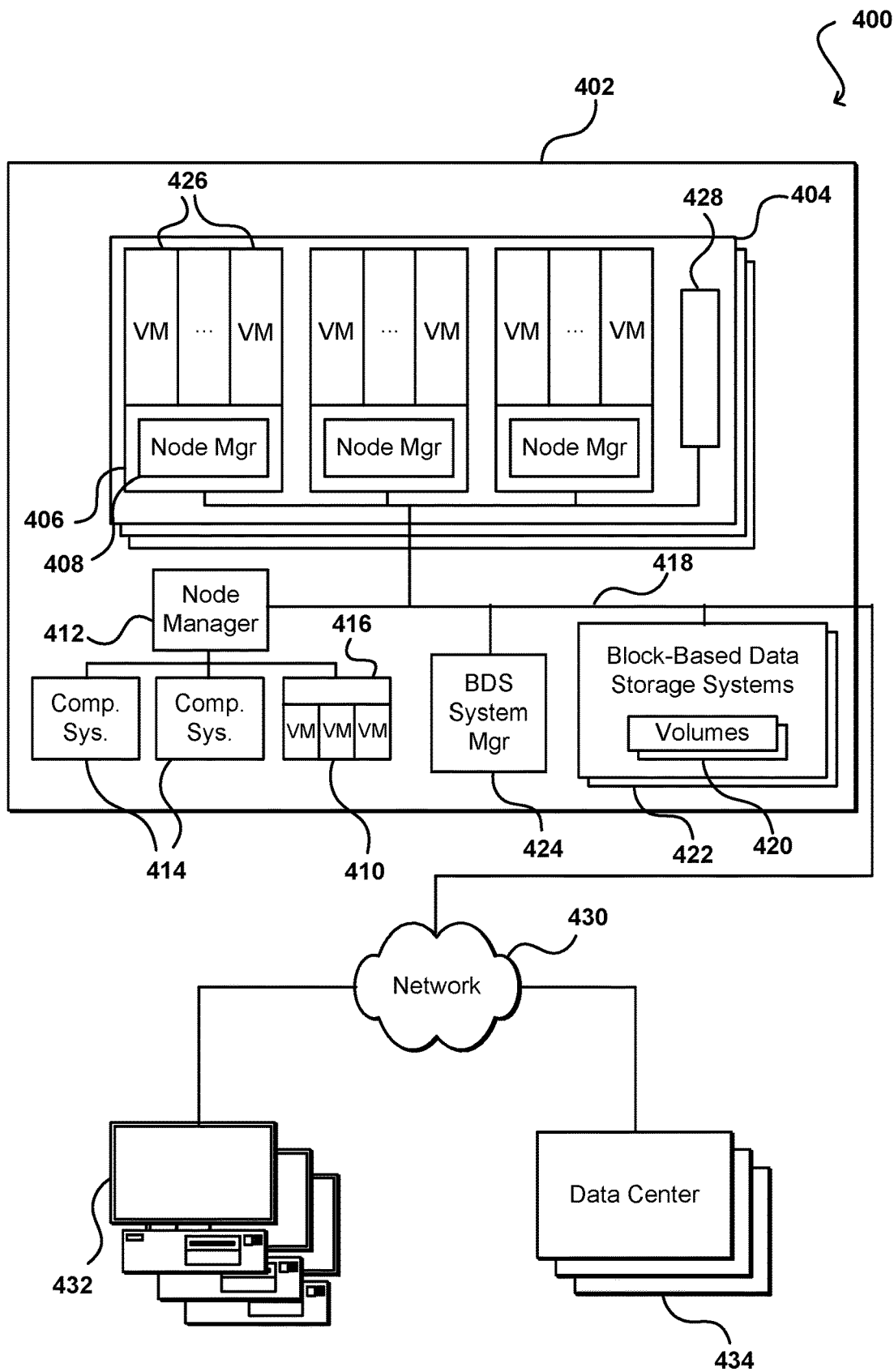
FIG. 4 illustrates components of an example block-based data storage service that can be utilized in accordance with various embodiments.

FIG. 4 illustrates an example network configuration 400 in which such provisioning can be implemented in accordance with various embodiments. In this example configuration, multiple computing systems are operable to execute various programs, applications, and/or services, and further operable to access reliable block-based data storage, such as under the control of a block-based data storage service. In particular, in this example a block-based data storage service uses multiple block-based data storage systems in a data center to provide reliable, non-local, block-based data storage to executing programs or various other components, systems, or services. Multiple remote archival storage systems external to the data center may also be used to store additional copies of at least some portions of at least some block-based data storage volumes.

In this example, a data center 402 includes a number of racks 404, each rack including a number of host computing devices 406, as well as an optional rack support computing system 428 in this example embodiment. The host computing systems 406 on the illustrated rack 404 each host one or more virtual machines 426 in this example, as well as a distinct node manager module 412 associated with the virtual machines on that host computing system to manage those virtual machines. One or more other host computing systems 416 may also each host one or more virtual machines 410 in this example. Each virtual machine 410 may act as an independent resource node for executing one or more program copies or performing another such action or process for user data requests, I/O operations, etc. In addition, this example data center 402 further includes additional host computing systems 414 that do not include distinct virtual machines, but may nonetheless each act as a resource node for one or more tasks being executed for a user. In this example, a node manager module 412 executing on a computing system (not shown) distinct from the host computing systems 414 and 416 is associated with those host computing systems to manage the resource nodes provided by those host computing systems, such as in a manner similar to the node manager modules 408 for the host computing systems 406. The rack support computing system 428 may provide various utility services for other computing systems local to its rack 404 (e.g., long-term program storage, metering, and other monitoring of program execution and/or of non-local block data storage access performed by other computing systems local to the rack, etc.), as well as possibly to other computing systems located in the data center. Each computing system may also have one or more local attached storage devices (not shown), such as to store local copies of programs and/or data created by or otherwise used by the executing programs, as well as various other components.

This example the data center 402 also includes a computing system 424 that executes a block-based data storage ("BDS") system manager module for the block-based data storage service to assist in managing the availability of non-local block-based data storage to programs executing on resource nodes provided by the host computing systems located within the data center (or optionally on computing systems located in one or more other data centers 434, or other remote computing systems 432 external to the data center). In particular, in this example the data center 402 includes a pool of multiple block-based data storage systems 422, which each have local block-based storage for use in storing one or more volume copies 420. Access to the volume copies 420 is provided over the internal network(s) 418 to programs executing on various resource nodes 410 and 414. As discussed in greater detail elsewhere, a block-based data storage system manager module 424 may provide a variety of services related to providing non-local block data storage functionality, including the management of user accounts (e.g., creation, deletion, billing, etc.); the creation, use and deletion of block data storage volumes and snapshot copies of those volumes; the collection and processing of performance and auditing data related to the use of block data storage volumes and snapshot copies of those volumes; the obtaining of payment from customers or other users for the use of block data storage volumes and snapshot copies of those volumes; etc. In some embodiments, the BDS system manager module 422 may coordinate with the node manager modules 412, 408 to manage use of volumes by programs executing on associated resource nodes, while in other embodiments the node manager modules may not be used to manage such volume use. In addition, in other embodiments, one or more BDS system manager modules 424 may be structured in other manners, such as to have multiple instances of the BDS system manager executing in a single data center (e.g., to share the management of non-local block data storage by programs executing on the resource nodes provided by the host computing systems located within the data center), and/or such as to have at least some of the functionality of a BDS system manager module being provided in a distributed manner by software executing on some or all of the server block data storage systems 422 (e.g., in a peer-to-peer manner, without any separate centralized BDS system manager module on a computing system 424).

In this example, the various host computing systems, server block data storage systems, and computing systems are interconnected via one or more internal networks 418 of the data center, which may include various networking devices (e.g., routers, switches, gateways, etc.) that are not shown. In addition, the internal networks 418 are connected to an external network 430 (e.g., the Internet or another public data network) in this example, and the data center 402 may further include one or more optional devices (not shown) at the interconnect between the data center and an external network (e.g., network proxies, load balancers, network address translation devices, etc.). In this example, the data center 402 is connected via the external network 430 to one or more other data centers 434 that each may include some or all of the computing systems and storage systems illustrated with respect to data center 402, as well as other remote computing systems 432 external to the data center. The other computing systems 432 may be operated by various parties for various purposes, such as by the operator of the data center or third parties (e.g., customers of the program execution service and/or of the block data storage service). In addition, one or more of the other computing systems may be archival storage systems (e.g., as part of a remote network-accessible storage service) with which the block data storage service may interact, such as under control of one or more archival manager modules (not shown) that execute on the one or more other computing systems or instead on one or more computing systems of the data center, as described in greater detail elsewhere. Furthermore, while not illustrated here, in at least some embodiments, at least some of the server block data storage systems 422 may further be interconnected with one or more other networks or other connection mediums, such as a high-bandwidth connection over which the block-based storage systems 422 may share volume data (e.g., for purposes of replicating copies of volumes and/or maintaining consistency between primary and mirror copies of volumes), with such a high-bandwidth connection not being available to the various host computing systems in at least some such embodiments.

It will be appreciated that the example of FIG. 4 has been simplified for the purposes of explanation, and that the number and organization of host computing systems, server block data storage systems and other devices may be much larger than what is depicted in FIG. 4. For example, as one illustrative embodiment, there may be thousands of computing systems per data center, with at least some of those computing systems being host computing systems that may each host fifteen virtual machines or more, and/or with some of those computing systems being block-based data storage systems that may each store several volume copies. If each hosted virtual machine executes one program, then such a data center may execute as many as tens of thousands of program copies at one time. Furthermore, hundreds or thousands (or more) of volumes may be stored on the server block data storage systems, depending on the number of server storage systems, size of the volumes, and number of mirror copies per volume. It will be appreciated that in other embodiments, other numbers of computing systems, programs and volumes may be used.

An environment such as that illustrated with respect to FIG. 4 can be used to provide and manage resources shared among various customers. In one embodiment, a virtualized storage system can be provided using a number of data servers, each having a number of storage devices (e.g., storage disks) attached thereto. The storage system can expose the storage to the customers as a Web service, for example. Customers then can submit Web services requests, or other appropriate requests or calls, to allocate storage on those servers and/or access that storage from the instances provisioned for those customers. In certain embodiments, a user is able to access the data volumes of these storage devices as if those storage devices are conventional block devices. Since the data volumes will appear to the customer instances as if each volume is a disk drive or similar block device, the volumes can be addressed with offsets, lengths, and other such conventional block device aspects. Further, such a system can provide what will be referred to herein as "read after write" consistency, wherein data is guaranteed to be able to be read from the data as soon as the data is written to one of these data volumes. Such a system can provide relatively low latency, such as latencies less than about ten milliseconds. Such a system thus in many ways functions as a traditional storage area network (SAN), but with improved performance and scalability.

Using a management system as illustrated in FIG. 4, for example, a customer can make a Web service call into an appropriate API of a Web service layer of the system to provision a data volume and attach that volume to a data instance for that customer. The management system can be thought of as residing in a control plane, or control environment, with the data volumes and block storage devices residing in a separate data plane, or data environment. In one example, a customer with at least one provisioned instance can call a "CreateVolume" or similar API, via Web services, which enables the customer to specify the amount of storage to be allocated, such as a value between 1 GB and 1 TB, in 1 GB increments. Components of the control plane, such as a BDS system manager module, can call into the data plane to allocate the desired amount of storage from the available resources, and can provide the customer with an identifier for the data volume. In some embodiments, the customer then can call an "AttachVolume" or similar API, wherein the customer provides values for parameters such as an instance identifier, a volume identifier, and a device name, depending on factors such as the operating system of the instance, using a scheme that the operating system provides for hard drives and similar storage devices, as from inside the instance there is no apparent difference, from at least a functionality and naming point of view, from a physical hard drive. Once the customer has attached the data volume to a provisioned instance, the customer can cause various functionality to be performed, such as to build a file system, use as raw storage for a data system, or any other such activity that would normally be performed with a conventional storage device. When the customer no longer requires the data volume, or for any other appropriate reason, the customer can call a "DetatchVolume" or similar API, which can cause the association of the instance to that volume to be removed. In some embodiments, the customer can then attach a new instance or perform any of a number of other such activities. Since the data volume will fail independently of the instances in some embodiments, the customer can attach a volume to a new instance if a currently associated instance fails.

In certain approaches, a customer requesting a data volume is not able to select or request a particular type of volume, or a particular type of performance. A customer is typically granted an amount of storage, and the performance follows a "best effort" type of approach, wherein customer requests are performed based on the capability, load, and other such factors of the system at the time of the request. Each customer is typically charged the same amount per unit measure, such as the same dollar amount per gigabyte of storage per month, as well as the same amount per number of I/O requests per month, charged in an amount such as in increments of millions of requests per month.

Figure 5:
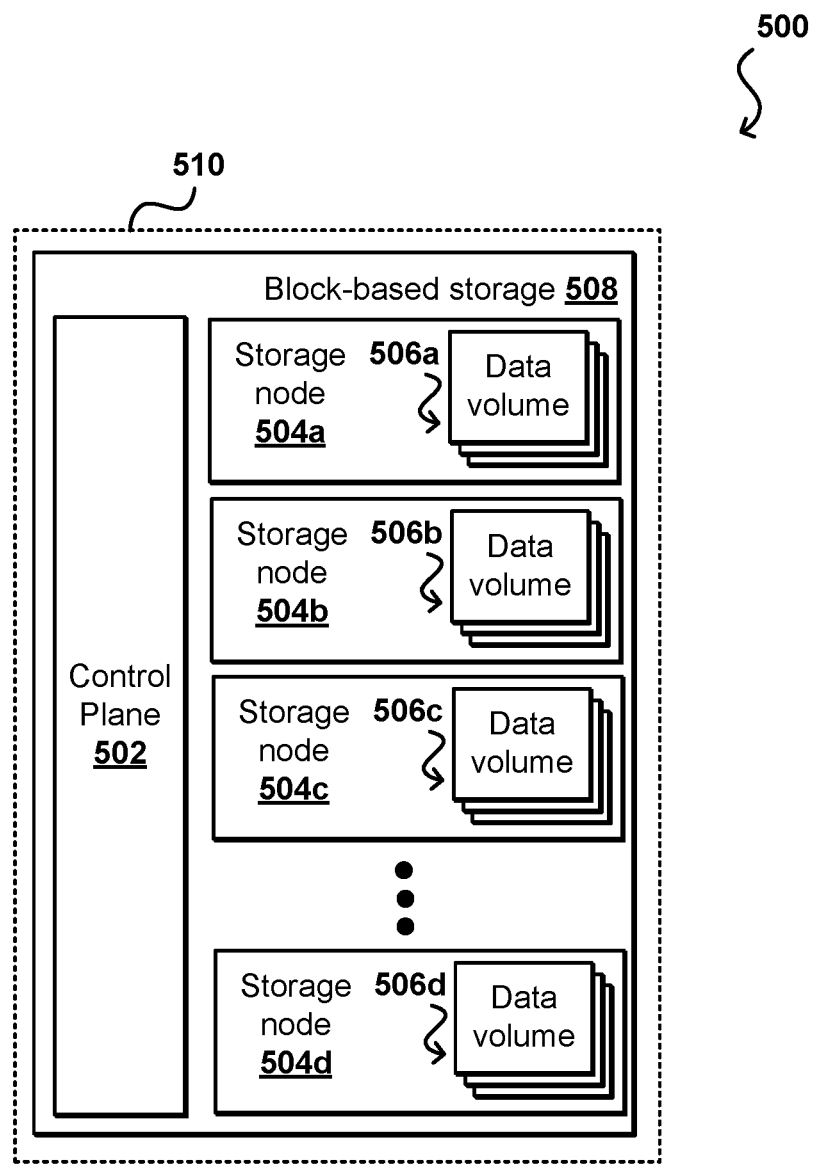
FIG. 5 illustrates a set of storage nodes that can be utilized in accordance with various embodiments.

A block-based storage service provider can implement functionality such as page cache write logging and the dynamic modifying of durability properties for data volumes. FIG. 5 is a block diagram illustrating components of a provider environment 202 such as id described with respect to FIG. 4. It should be understood that reference numbers may be carried over between figures for similar elements for purposes of simplicity of understanding, but that such usage should not be interpreted as a limitation on the various embodiments unless otherwise explicitly stated herein. Multiple network-based services can be implemented in such an environment, as may include a block-based storage service 508 in at least some embodiments. A provider environment 510, or other such multi-tenant or shared resource environment, may be set up by an entity such as a company or a public sector organization to provide one or more services (such as various types of cloud-based computing or storage) accessible via the Internet and/or other networks to clients. The provider environment 510 may include numerous data centers hosting various resource pools, such as collections of physical and/or virtualized computer servers, storage devices, networking equipment and the like, used to implement and distribute the infrastructure and services offered by the provider environment 510. In some embodiments, the provider environment 510 may provide computing resources, such as virtual compute services, storage services, and/or any other type of network-based services. Clients can access these various services offered by the provider environment over an appropriate network. Likewise, network-based services may themselves communicate and/or make use of one another to provide different services. For example, computing resources can be offered to clients in units called "instances," such as virtual or physical compute instances or storage instances, that make use of particular data volumes, providing virtual block storage for the compute instances.

In various embodiments, the provider environment 510 implements a block-based storage 508 system or service for performing storage operations. The example block-based storage 508 is a storage system, composed of a pool of multiple independent storage nodes 504a, 504b, 504c through 504n (e.g., server block data storage systems), which provide block level storage for storing one or more sets of data volumes 506a, 506b, 506c, through 506n. The data volumes 506 can be mapped to particular clients, providing virtual block-based storage (e.g., hard disk storage or other persistent storage) as a contiguous set of logical blocks. In some embodiments, a data volume 506 may be divided up into multiple data chunks (including one or more data blocks) for performing other block storage operations, such as snapshot operations or replication operations.

A snapshot of a data volume 506 may be a fixed point-in-time representation of the state of the data volume. In some embodiments, snapshots may be stored remotely from a storage node 504 maintaining a data volume 506, such as in another storage service. Snapshot operations may be performed to send, copy, and/or otherwise preserve the snapshot of a given data volume in another storage location, such as a remote snapshot data store in another storage service.

A block-based storage service 508 can implement a block-based storage service control plane 502 to assist in the operation of the block-based storage service 508. In various embodiments, the block-based storage service control plane 502 assists in managing the availability of block data storage to clients, such as programs executing on compute instances provided by a virtual compute service and/or other network-based services located within the provider environment 510 and/or optionally computing systems (not shown) located within one or more other data centers, or other computing systems external to the provider network and available over at least one network. Access to the data volumes 506 may be provided over an internal network within the provider network 510 or externally via an appropriate network, in response to block data transaction instructions.

A block-based storage service control plane 502 can provide a variety of services related to providing block level storage functionality, including the management of user accounts (e.g., creation, deletion, billing, collection of payment, etc.). The block-based storage service control plane 502 may further provide services related to the creation, usage and deletion of data volumes 506 in response to configuration or other such requests. The block-based storage service control plane 502 can also provide services related to the creation, usage, and deletion of volume snapshots on another storage service. The block-based storage service control plane 502 may also provide services related to the collection and processing of performance and auditing data related to the use of data volumes 506 and snapshots of those volumes.

The provider environment 510 may also implement other storage services, as noted above. Another storage service may provide a same or different type of storage as provided by the block-based storage service 508. For example, in some embodiments another storage service may provide an object-based storage service, which may store and manage data as data objects. For example, volume snapshots of various data volumes 506 may be stored as snapshot objects for a particular data volume 506. In addition to another storage service, the provider environment 510 may implement other network-based services, which can include various different types of analytical, computational, storage, or other network-based system allowing clients, as well as other services of the provider environment (e.g., a block-based storage service, virtual compute service, and/or other storage service) to perform or request various tasks.

Client devices capable of interacting with the provider environment can encompass any type of device configurable to submit requests to the network environment. For example, a given client may include a suitable version of a Web browser, or may include a plug-in module or other type of code module configured to execute as an extension to, or within, an execution environment provided by a Web browser. Alternatively, a client may encompass an application such as a database application (or user interface thereof), a media application, an office application or any other application that may make use of compute instances, a data volume 506, or other network-based service in the provider environment 502 to perform various operations. In some embodiments, such an application may include sufficient protocol support (e.g., for a suitable version of Hypertext Transfer Protocol (HTTP)) for generating and processing network-based services requests without necessarily implementing full browser support for all types of network-based data. In some embodiments, clients may be configured to generate network-based service requests. In some embodiments, a client (e.g., a computational client) may be configured to provide access to a compute instance or data volume 506 in a manner that is transparent to applications implemented on the client, utilizing computational resources provided by the compute instance or block storage provided by the data volume 506.

Client devices can convey network-based services requests to the provider environment via an external network. In various embodiments, the external network may encompass any suitable combination of networking hardware and protocols necessary to establish network-based communications between the client devices and the provider environment. For example, a network may generally encompass the various telecommunications networks and service providers that collectively implement the Internet. A network may also include private networks such as local area networks (LANs) or wide area networks (WANs) as well as public or private wireless networks. For example, both a given client device and provider network may be respectively provisioned within enterprises having their own internal networks. In such an embodiment, a network may include the hardware (e.g., modems, routers, switches, load balancers, proxy servers, etc.) and software (e.g., protocol stacks, accounting software, firewall/security software, etc.) necessary to establish a networking link between a given client device and the Internet, as well as between the Internet and the provider environment. It is noted that in some embodiments, the clients may communicate with provider environment 202 using a private network rather than the public Internet.

Figure 6:
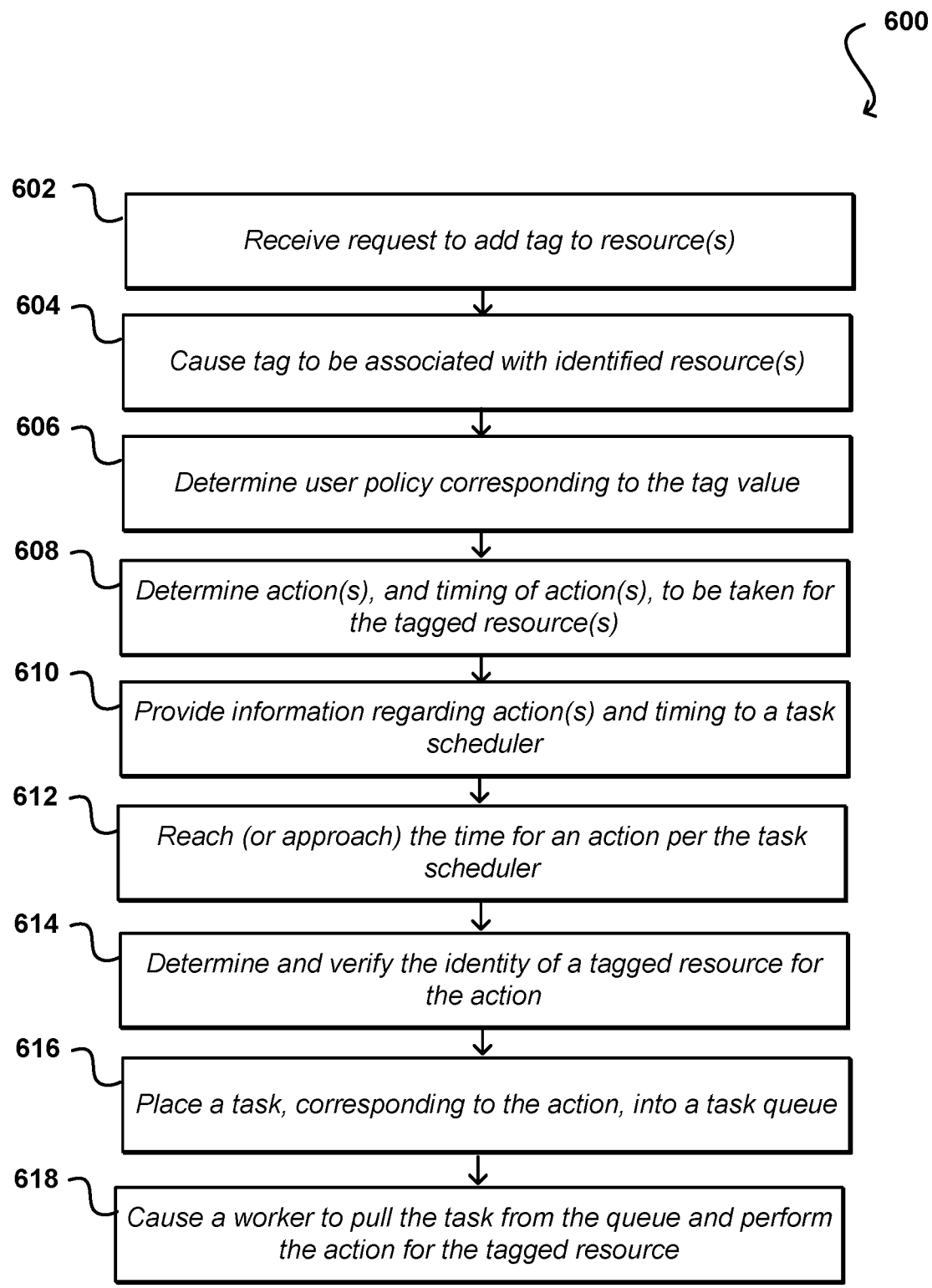
FIG. 6 illustrates an example process for managing resources using a set of resource tags and policies that can be utilized in accordance with various embodiments.

FIG. 6 illustrates an example process 600 for managing policies for a set of resources that can be utilized in accordance with various embodiments. It should be understood for the various processes described herein that additional, fewer, or alternative steps can be performed in similar or alternative orders, or in parallel, within the scope of the various embodiments unless otherwise stated. In this example, a request is received 602 to add a tag to one or more resources. In this example, the request can be received on behalf of a customer, and can be applied to any appropriate types of resources that are allocated to the customer or associated with a customer account. The customer can have a set of tags from which to choose, or can provide a new tag, as discussed herein. The tags can be identifiers, key-value pairs, or other metadata that can be used to indicate a resource for which a policy is to be applied and/or enforced. The request can be received through any appropriate mechanism, such as a message, API call, console entry, or command line prompt, among other such options. Once received, the tag can be caused 604 to be associated with the identified resource(s), such as by being added to resource metadata, added as a record to a resource data table, etc. In some embodiments a user can specify or select a specific resource, while in other embodiments the user can specify a type or location of resources, among other such groupings or identification mechanisms.

In response to the addition or modification of a tag, or another such trigger or criterion, a determination can be made 606 as to the relevant user or customer policy that corresponds to the tag, or value specified by the tag. In some embodiments, a periodic sweep will be performed to determine current tags and ensure that the relevant or current policy is applied for the tagged resources. Once the corresponding policy is identified, the policy can be examined to determine 608 one or more actions to be enforced under the policy, as well as the timing (i.e., specific times or frequency) of those actions for the tagged resources. The timing could be different for different actions, such as to create a new snapshot at 9 am every day, but delete the oldest snapshot(s) weekly. Information regarding the action(s) and the timing can be provided 610 to at least one task scheduler or task manager responsible for ensuring that the actions are performed according to the timing indicated by the relevant policy. The scheduler can analyze the information and generate any appropriate data or internal mechanisms for ensuring that the frequency or timing is met on a consistent basis over time.

As time progresses, it will periodically be the case that the time reaches 612 or approaches the time for an action per the task scheduler. As known for such purposes, it can be desirable to initiate a task before the scheduled time in some embodiments in order to ensure that the action itself is actually performed at the determined time. The identity of a tagged resource for the action can be determined 614, and in this example it will also be verified that the resource is still current, the tag is still applied to that resource, and the same policy still applies and has not changed the action to be performed. At least one task, corresponding to the action to be performed, can be placed 616 into a relevant task queue for the resource and/or action. As mentioned there can be multiple queues in some embodiments, and other mechanisms can be used to schedule actions as well in other embodiments. A worker, such as a virtual resource configured to perform a specific type of task (e.g., a virtual machine, container, or serverless function), can be caused 618 to pull the task from the queue and perform the indicated action with respect to the tagged resource. In some embodiments a worker will try up to a maximum number of times, or up to a maximum number of workers will try to perform the task, before failing the task. If the task is successfully performed, or at least attempted in some embodiments, the worker can report back information about the performance. The information can then be stored for audit and compliance purposes, or at least to verify that the action was performed and the relevant policy is being enforced for the tagged resource(s).

Figure 7:
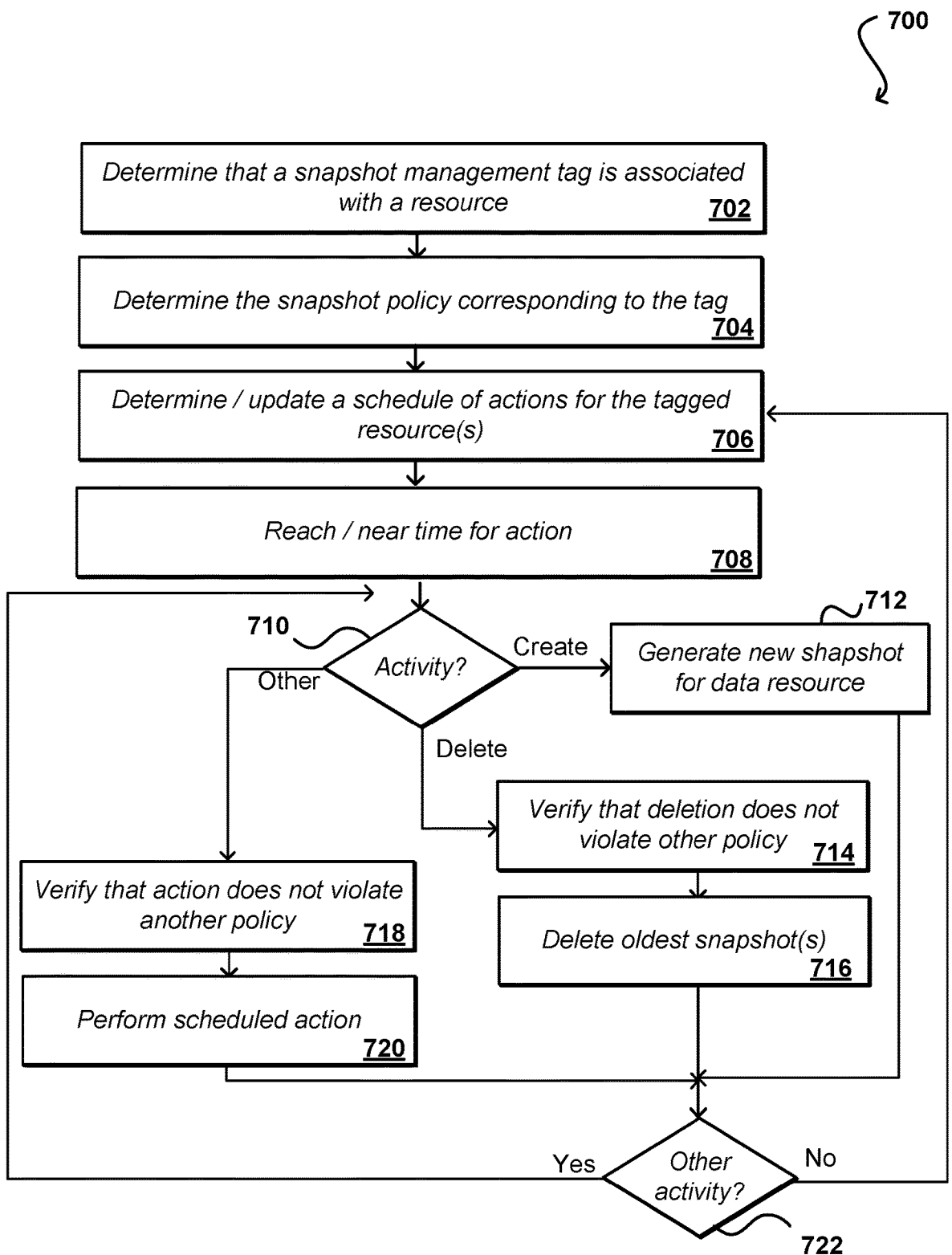
FIG. 7 illustrates an example process for managing resource snapshots that can be utilized in accordance with various embodiments.

FIG. 7 illustrates an example process 700 for managing snapshots for a resource that can be utilized in accordance with various embodiments. While snapshots are used in this and other examples for purposes of explanation, it should be understood that various other actions can be taken as well as discussed and suggested elsewhere herein. In this example, it can be determined 702, as discussed with respect to FIG. 6, that a snapshot management tag is associated with a resource. As mentioned, the resource can be associated with the tag by a customer or other authorized entity. The snapshot policy corresponding to the tag can be determined 704, and it can be ensured that the latest or relevant version of the policy is to be applied as appropriate. Based at least in part upon the policy, a schedule of actions to be performed for the tagged resource(s) can be determined 706 and/or updated. Updates can be determined when, for example, the policy changes or the resources that are tagged change, among other such options. As mentioned, a schedule for the actions can be generated, where the actions may be scheduled for all tagged resources at the same time, or may vary by resource. For example, if the policy includes an action to create a snapshot at midnight for each resource then the snapshot for each resource will be generated at approximately the same time, while a policy that indicates to delete the oldest snapshot for each resource every Saturday might enable those snapshots to be deleted any time it is convenient on a given Saturday, within any permissible guidelines on variance.

When it is determined that the time has reached 708 or is near a time for a specific action, a determination of the type of action to be made can be performed. As mentioned, there may be more than one task or activity associated with a specific action. In this example the type of activity for the action to be performed for the action can be determined 710. This can include, for example, whether a new snapshot for a resource is to be generated. If so, the new snapshot can be generated 712 for the resource per the policy. The determination might also, or alternatively, indicate that a snapshot is to be deleted. For example, a policy might indicate to keep up to a maximum number of concurrent snapshots, such that the creation of a new snapshot means that the oldest snapshot is to be deleted. If a snapshot is to be deleted, then in this example it can be verified 714 that the deletion does not violate another policy. As mentioned, it may not be as critical when creating an additional snapshot, but it can be important to verify that any deletion of a snapshot would not violate a retention policy or other policy relevant for the resource. If the deletion would not violate any retention policy then the oldest snapshot(s) can be deleted 716 according to the policy. It should be understood that in some embodiments the creation and deletion actions can occur concurrently, or can be different parts of the same task or activity, among other such options. As discussed, in some embodiments the creation of a new snapshot might trigger the deletion activity as well, among other such actions. It also might be determined that there is another action to take, such as to move a snapshot or otherwise perform a separate action with respect to a resource, or data stored on a resource. For one of these other activities, it can be verified 718 that the action does not violate another policy, and that scheduled (or now to be performed) action can be performed 720 per the policy. As illustrated, there may be multiple activities to be performed, such that a determination can be made 722 whether another activity has yet to be performed. If so, the process can continue. Otherwise, once the activities are completed the process can return to a state where a subsequent action will be taken when the next scheduled action time is reached, or other such action criterion met. The policies, tags, and/or resources can periodically be evaluated to ensure that the proper policies are being enforced for the tagged resources. As mentioned, these can be resources in a resource environment or provided by a single entity, or can span multiple environments or entities among the various embodiments.

Figure 8:
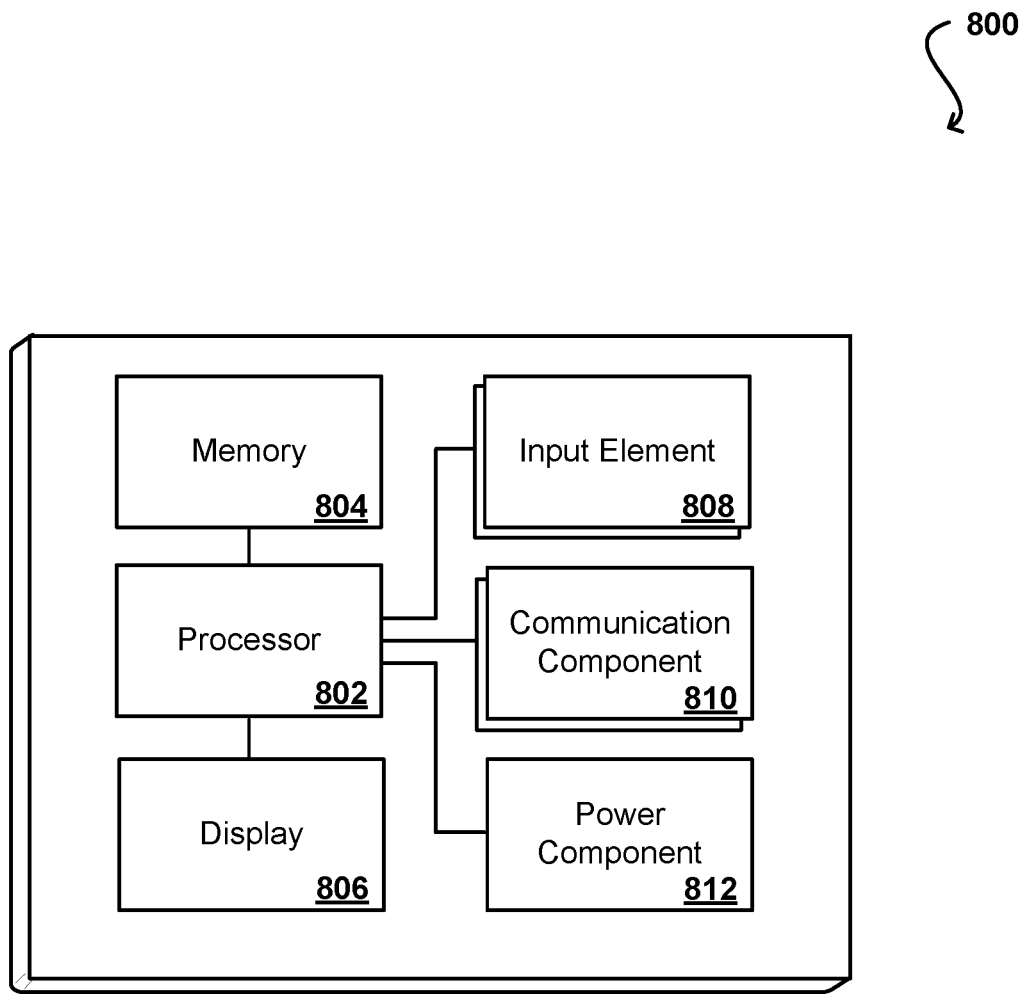
FIG. 8 illustrates components of an example computing device that can be used to perform aspects of the various embodiments.

FIG. 8 illustrates a logical arrangement of a set of general components of an example computing device that can be used to implement aspects of the various embodiments. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device may include some type of display element 806, such as a touch screen or liquid crystal display (LCD), although devices such as portable media players might convey information via other means, such as through audio speakers. In some embodiments, the computing device 800 can include one or more networking and/or communication elements 808, such as a Wi-Fi, Bluetooth, RF, wired, or wireless communication system. The device in many embodiments can communicate with a network, such as the Internet, and may be able to communicate with other such devices. In some embodiments the device can include at least one additional input component 810 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. The device will also include one or more power components 812, such as a power source, battery compartment, wireless charging circuitry, and the like, for providing and/or obtaining the power needed for the computing device.

As discussed, different approaches can be implemented in various environments in accordance with the described embodiments. As will be appreciated, although a Web-based environment may be used for many examples herein for purposes of explanation, different environments may be used, as appropriate, to implement various embodiments. Such a system can include one or more electronic client devices, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof.

An illustrative environment can include at least one application server and data store. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of any system herein should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable non-transitory media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving an indication of a data resource for which a snapshot policy is to be enforced, the data resource being one of a plurality of resources offered through a multi-tenant resource environment;
   causing a tag to be associated with the data resource, the tag including a key-value pair associated with the snapshot policy;
   causing the tag to be applied to multiple data resources, wherein a change to the snapshot policy is automatically enforced for the multiple data resources having the tag applied;
   determining a set of actions to be performed, with respect to the data resource, per the snapshot policy, the set of actions including at least generating data snapshots for the data resource and deleting the data snapshots;
   determining timing information including at least one of specified times or frequencies for the actions of the set of actions;
   verifying that the tag is associated with the data resource and that the snapshot policy is valid before performing respective actions of the set of actions; and
   causing the respective actions, of the set of actions, to be performed with respect to the data resource per the timing information.

2. The computer-implemented method of claim 1, further comprising:
   causing a second tag to be applied to second data resource, the second tag including a second key-value pair associated with a second snapshot policy; and
   enforcing the second snapshot policy for the second data resource.

3. The computer-implemented method of claim 1, wherein the set of actions include at least one of migrating a snapshot to a different type of resource, maintaining a snapshot for a specified duration of time, maintaining a specified number of concurrent snapshots for the data resource, or maintaining up to a maximum number of concurrent snapshots for the data resource.

4. A computer-implemented method, comprising:
   receiving a request to apply a lifecycle policy to an identified block storage resource in a service provider environment;
   receiving the lifecycle policy from a customer of the service provider environment;
   causing tag metadata, corresponding to the lifecycle policy, to be associated with the identified block storage resource and enabling the customer to associate the tag metadata with other resources of the service provider environment, that are allocated to the customer;

determining at least one action to be performed per the lifecycle policy, the at least one action associated with one or more action criteria, the one or more action criteria including at least one of a timing, a frequency, a maximum number, a minimum number, or a type of occurrence in the service provider environment;

causing a respective action, of the at least one action, to be performed when an action criterion, of the one or more action criteria, is satisfied, wherein the respective action is performed for the identified block storage resource and any additional resources, in the service provider environment, with which the tag metadata is associated; and causing a task for the respective action to be placed in a task queue, wherein a worker process is enabled to pull the task from the task queue and perform the respective action with respect to the identified block storage resource.

5. The computer-implemented method of claim 4, wherein the specified resource is a data storage resource, and wherein the respective action relates to at least one of a backup, a snapshot, an encryption, a migration, or a deletion of an instance of customer data stored by the data resource.

6. The computer-implemented method of claim 4, further comprising:
ensuring that the respective action does not cause another policy, associated with the identified block storage resource, to be violated before causing the respective action to be performed.

7. The computer-implemented method of claim 4, further comprising:
verifying that the tag metadata is still associated with the identified block storage resource and that the lifecycle policy is still valid before performing the respective action.

8. The computer-implemented method of claim 4, further comprising:
enabling the tag metadata, associated with the identified block storage resource, to be modified or deleted in order to cause the lifecycle policy to no longer be enforced for the identified block storage resource.

9. The computer-implemented method of claim 4, further comprising:
causing the tag metadata to be applied to multiple resources, wherein a change to the lifecycle policy is automatically enforced for the multiple resources having the tag metadata applied.

10. The computer-implemented method of claim 4, further comprising:

causing second tag metadata to be applied to second resource, the second tag metadata associated with a second lifecycle policy; and
enforcing the second lifecycle policy for the second resource.

11. The computer-implemented method of claim 4, further comprising:
scheduling a set of actions to be performed for each resource tagged with the tag metadata per a resource lifecycle defined by the lifecycle policy.

12. A system, comprising:
at least one processor; and
memory including instructions that, when executed by the at least one processor, cause the processor to:
receive a request to apply a lifecycle policy to an identified block storage resource in a service provider environment;
receive the lifecycle policy from a customer of the service provider environment;
cause tag metadata, corresponding to the lifecycle policy, to be associated with the identified block storage resource and enable the customer to associate the tag metadata with other resources of the service provider environment, that are allocated to the customer;
determine at least one action to be performed per the lifecycle policy, the at least one action associated with one or more action criteria, the one or more action criteria including at least one of a timing, a frequency, a maximum number, a minimum number, or a type of occurrence in the service provider environment;
cause a respective action, of the at least one action, to be performed when an action criterion, of the one or more action criteria, is satisfied, wherein the respective action is performed for the identified block storage resource and any additional resources, in the service provider environment, with which the tag metadata is associated; and
cause a task for the respective action to be placed in a task queue, wherein a worker process is enabled to pull the task from the task queue and perform the respective action with respect to the identified block storage resource.

13. The system of claim 12, further comprising:
an application program interface (API) enabling at least one of the lifecycle policy or the tag metadata to be specified by the customer.

14. The system of claim 12, wherein the instructions when executed further cause the system to:
schedule a set of actions to be performed for each resource tagged with the tag metadata per a resource lifecycle defined by the lifecycle policy.

* * * * *